(12) United States Patent
Shin et al.

(10) Patent No.: US 12,212,005 B2
(45) Date of Patent: Jan. 28, 2025

(54) LITHIUM BATTERY WITH IMPROVED PENETRATION CHARACTERISTICS AND MANUFACTURING METHOD THEREFOR

(71) Applicant: SAMSUNG SDI CO., LTD., Yongin-si (KR)

(72) Inventors: Sejong Shin, Yongin-si (KR); Ochang Gwon, Yongin-si (KR); Hogon You, Yongin-si (KR); Rizhu Yin, Yongin-si (KR); Taekyeong Lee, Yongin-si (KR); Inho Jung, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 1170 days.

(21) Appl. No.: 16/968,254

(22) PCT Filed: Dec. 19, 2018

(86) PCT No.: PCT/KR2018/016237
§ 371 (c)(1),
(2) Date: Aug. 7, 2020

(87) PCT Pub. No.: WO2019/156344
PCT Pub. Date: Aug. 15, 2019

(65) Prior Publication Data
US 2021/0036329 A1    Feb. 4, 2021

(30) Foreign Application Priority Data
Feb. 9, 2018 (KR) .................. 10-2018-0016564

(51) Int. Cl.
*H01M 4/04* (2006.01)
*H01M 4/131* (2010.01)
(Continued)

(52) U.S. Cl.
CPC ......... *H01M 4/628* (2013.01); *H01M 4/0445* (2013.01); *H01M 4/0447* (2013.01);
(Continued)

(58) Field of Classification Search
CPC ............ H01M 4/0445; H01M 10/058; H01M 4/0402; H01M 4/8882; H01M 4/8896;
(Continued)

(56) References Cited

U.S. PATENT DOCUMENTS

| 5,672,445 A | 9/1997 | Nakamitsu et al. |
| 8,088,513 B2 | 1/2012 | Machida et al. |

(Continued)

FOREIGN PATENT DOCUMENTS

| EP | 3902052 A1 * | 10/2021 | .......... H01M 10/052 |
| JP | 2002-151152 A | 5/2002 | |

(Continued)

OTHER PUBLICATIONS

Korean Notice of Allowance mailed Sep. 2, 2021 for corresponding KR Patent Application No. 10-2018-0016564.
(Continued)

*Primary Examiner* — Jeremiah R Smith
(74) *Attorney, Agent, or Firm* — Lee IP Law, P.C.

(57) ABSTRACT

Disclosed is a lithium battery comprising: a cathode; an anode including a passivation film; and an electrolyte interposed between the cathode and the anode, wherein the passivation film includes 0.5 wt % or more and less than 5 wt % of sulfur (S), and the passivation film has a heating value of 50 J/g or less when a nail penetrates the passivation film. The lithium battery has improved penetration characteristics.

19 Claims, 4 Drawing Sheets

(51) Int. Cl.
*H01M 4/133* (2010.01)
*H01M 4/38* (2006.01)
*H01M 4/505* (2010.01)
*H01M 4/525* (2010.01)
*H01M 4/62* (2006.01)
*H01M 4/88* (2006.01)
*H01M 10/0525* (2010.01)
*H01M 4/02* (2006.01)

(52) U.S. Cl.
CPC ......... *H01M 4/0471* (2013.01); *H01M 4/131* (2013.01); *H01M 4/133* (2013.01); *H01M 4/386* (2013.01); *H01M 4/505* (2013.01); *H01M 4/525* (2013.01); *H01M 4/8882* (2013.01); *H01M 4/8896* (2013.01); *H01M 10/0525* (2013.01); *H01M 2004/027* (2013.01); *H01M 2004/028* (2013.01)

(58) Field of Classification Search
CPC . H01M 4/628; H01M 10/052; H01M 10/0525
See application file for complete search history.

(56) References Cited

U.S. PATENT DOCUMENTS

| | | | | |
|---|---|---|---|---|
| 9,105,938 | B2* | 8/2015 | Scordilis-Kelley | H01M 4/139 |
| 2004/0110068 | A1* | 6/2004 | Seki | H01M 4/525 |
| | | | | 429/162 |
| 2010/0035128 | A1* | 2/2010 | Scordilis-Kelley | H01M 4/139 |
| | | | | 429/231.95 |
| 2010/0233549 | A1* | 9/2010 | Kim | H01M 10/052 |
| | | | | 429/207 |
| 2014/0255796 | A1* | 9/2014 | Matsuoka | H01M 4/139 |
| | | | | 429/188 |
| 2014/0255797 | A1* | 9/2014 | Manthiram | H01M 10/0568 |
| | | | | 429/188 |
| 2015/0200422 | A1 | 7/2015 | Lee et al. | |
| 2015/0303518 | A1* | 10/2015 | Iriyama | H01M 4/1393 |
| | | | | 429/188 |
| 2015/0349380 | A1* | 12/2015 | Manthiram | H01M 50/46 |
| | | | | 429/188 |
| 2016/0240858 | A1 | 8/2016 | Yamada et al. | |
| 2016/0261006 | A1 | 9/2016 | Ueno et al. | |
| 2016/0344060 | A1* | 11/2016 | Asano | H01M 50/461 |
| 2016/0380299 | A1* | 12/2016 | Umeyama | H01M 10/0431 |
| | | | | 429/94 |
| 2017/0005369 | A1* | 1/2017 | Nakagawa | H01M 50/446 |
| 2018/0026305 | A1* | 1/2018 | Takada | H01M 10/0567 |
| | | | | 429/188 |
| 2018/0277852 | A1 | 9/2018 | Yamada et al. | |
| 2018/0351158 | A1* | 12/2018 | Liao | H01M 10/4235 |
| 2018/0366778 | A1* | 12/2018 | Liu | H01M 10/0562 |
| 2020/0067129 | A1* | 2/2020 | Hao | H01M 10/049 |
| 2020/0251786 | A1* | 8/2020 | Kawai | H01M 10/0413 |

FOREIGN PATENT DOCUMENTS

| | | |
|---|---|---|
| JP | 2005-259566 A | 9/2005 |
| JP | 3719405 B2 | 11/2005 |
| JP | 2007-128804 A | 5/2007 |
| KR | 10-2006-0060587 A | 6/2006 |
| KR | 10-2013-0065371 A | 6/2013 |
| KR | 10-2013-0126365 A | 11/2013 |
| KR | 10-2015-0085670 A | 7/2015 |
| KR | 10-2016-0060718 A | 5/2016 |
| KR | 10-1873659 B1 | 7/2018 |
| KR | 10-1900990 B1 | 9/2018 |
| KR | 10-1901676 B1 | 11/2018 |

OTHER PUBLICATIONS

International Search Report dated Apr. 15, 2019 for PCT/KR2018/016237.

* cited by examiner (a)

(b)

(c)

(d)

(e)

LITHIUM BATTERY WITH IMPROVED PENETRATION CHARACTERISTICS AND MANUFACTURING METHOD THEREFOR

CROSS REFERENCE TO RELATED APPLICATIONS

This is the U.S. national phase application based on PCT Application No. PCT/KR2018/016237, filed Dec. 19, 2018, which is based on Korean Patent Application No. 10-2018-0016564, filed Feb. 9, 2018, the entire contents of all of which are hereby incorporated by reference.

TECHNICAL FIELD

The present disclosure relates to a lithium battery having improved penetration characteristics and a method of manufacturing the same.

BACKGROUND ART

In order to meet the miniaturization and high performance of various devices, miniaturization and weight reduction of lithium batteries are becoming important. Further, in order to apply lithium batteries to fields such as electric vehicles, discharge capacity, energy density and cycle characteristics of lithium batteries are becoming important. Lithium batteries having a large discharge capacity per unit volume, a high energy density, and excellent life characteristics are required to meet the above applications.

Meanwhile, as the use of lithium batteries increases, the demand for safety thereof increases. For example, a case where a lithium battery is deformed by external impacts or a battery pack is penetrated by a sharp object may be problematic. In particular, in the case of an electric vehicle, if an accident or the like occurs, a possibility of a battery pack being penetrated increases.

In the case where the battery pack is penetrated in this way, when an anode and a cathode, which are charged, are physically in contact with each other and thus high current instantaneously flows through a space formed by the penetration of the battery pack, abnormal heat generation and thermal runaway of the battery pack may occur. That is, an electrolyte acts as a fuel for a combustion reaction of the battery, so that the combustion reaction proceeds spontaneously and combustion heat accumulates inside a cell, and temperature continuously rises to induce a chain pyrolysis reaction. Accordingly, ignition or explosion of an appliance or device quipped with the battery pack may occur.

As such, as the demand for safety of lithium batteries increases, penetration safety is recognized as an important evaluation item among various safety evaluation items for lithium batteries, and thus improvement thereof is required.

DESCRIPTION OF EMBODIMENTS

Technical Problem

Provided is a lithium battery having improved penetration characteristics.

Provided is a method of manufacturing the lithium battery.

Solution to Problem

According to an aspect of the present disclosure, a lithium battery includes: a cathode; an anode including a passivation film; and an electrolyte interposed between the cathode and the anode, wherein the passivation film includes 0.5 wt % or more and less than 5 wt % of sulfur (S), and the passivation film has a heating value of 50 J/g or less when a nail penetrate the passivation film.

According to another aspect of the present disclosure, A method of manufacturing the lithium battery includes:

(a) preparing a battery assembly having a concentration of a lithium salt in the electrolyte of 0.6 M or more and less than 1.30 M and a capacity ratio ($C_N/C_P$) of a charging capacity ($C_N$) of the anode to a charging capacity ($C_P$) of the cathode of 1.0 to 1.06; and (b) charging the battery assembly to a state of charge (SOC) of 50% to 100% and heat-treating the battery assembly at a temperature of 50° C. to 150° C. under a pressure of 1 kgf/cm² to 20 kgf/cm².

Advantageous Effects of Disclosure

In the lithium battery according to an aspect of the present disclosure, the heating value of the passivation film of the anode is controlled to 50 J/g or less when a nail penetrate the passivation film, so that penetration characteristics may be improved without deteriorating the performance of the battery to suppress the ignition and thermal runaway of the battery, thereby improving stability.

DESCRIPTION OF REFERENCE NUMERALS FOR MAIN PARTS OF THE DRAWINGS

Figure 1:
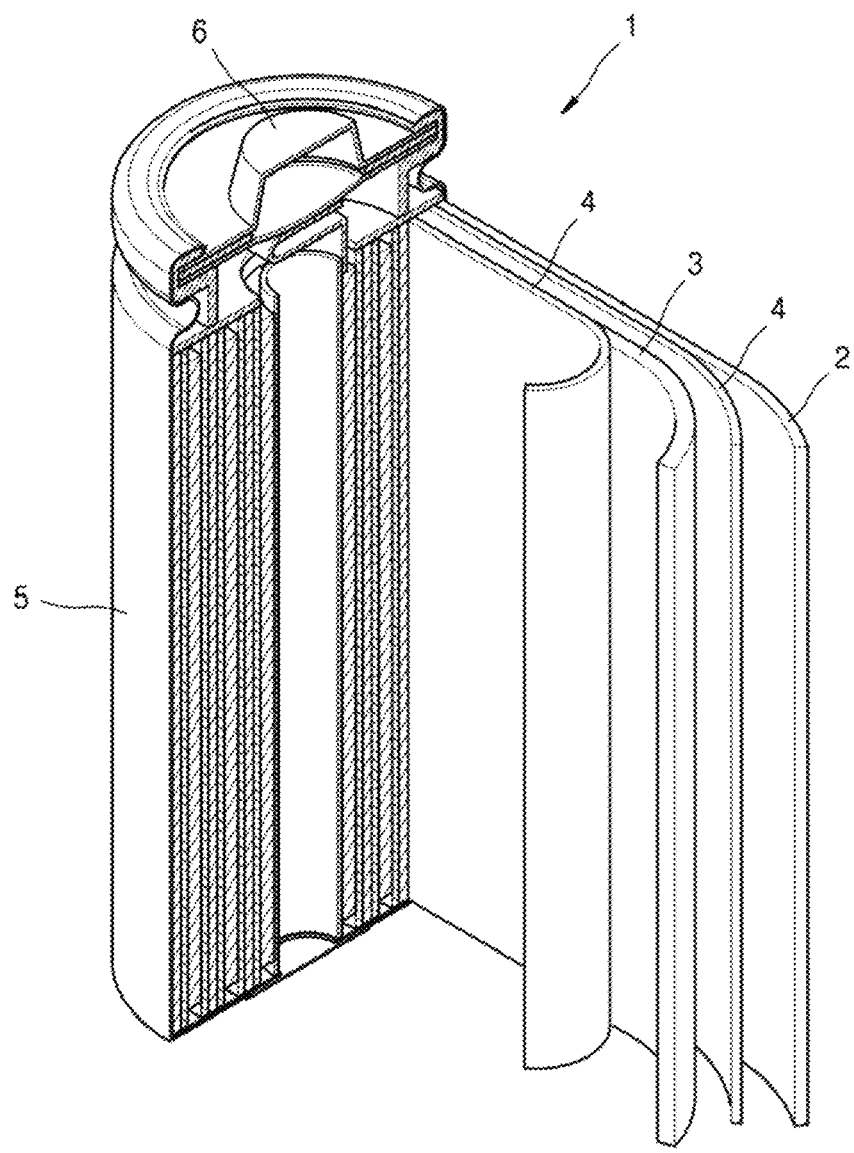
FIG. 1 is a schematic view of a lithium battery according to an exemplary embodiment.

1: lithium battery
2: anode
3. cathode
4: separator
5: battery case
6: cap assembly

BEST MODE

Hereinafter, a lithium battery according to an embodiment of the present disclosure and a manufacturing method thereof will be described in detail. The following embodiments are presented as examples, and the present disclosure is not limited thereto. The present disclosure is only defined by the scope of claims to be described later.

A lithium battery according to an embodiment includes: a cathode; an anode including a passivation film; and an electrolyte interposed between the cathode and the anode, wherein the passivation film includes 0.5 wt % or more and less than 5 wt % of sulfur (S), and the passivation film has a heating value of 50 J/g or less when a nail penetrates the passivation film.

Generally, when a lithium battery is penetrated by a sharp object such as a nail, a short circuit occurs to generate joule heat, and then an endothermic reaction of a separator and a decomposition reaction of the passivation film of the anode occur, and a primary exothermic reaction of the cathode and a secondary exothermic reaction of the anode occur sequentially to cause ignition and thermal runaway. In this case, the passivation film of the anode is melted or decomposed in a temperature range of about 80° C. to about 100° C. On the electrode surface where the passivation film is decomposed, the electrolyte is additionally decomposed, and gas is generated and heat is generated, thereby increasing the temperature inside the battery.

In order to solve the above problem, the lithium battery of the present disclosure includes a passivation film (anode passivation film) on the anode, and employs a method of controlling a heating value to 50 J/g less during the decomposition reaction of the passivation film when the passivation film is penetrated by a sharp object such as a nail. When the heating value of the passivation film is controlled to 50 J/g less at the time of penetration of the nail into the passivation film, penetration characteristics may be improved without deteriorating the performance of the battery, thereby preventing the abnormal ignition and thermal runaway of the battery.

In this case, the passivation film, the heating value of which is controlled to 50 J/g less at the time of penetration of the nail into the passivation film, may contain 0.5 wt % or more and less than 5 wt % of sulfur (S). For example, the passivation film may contain 0.5 wt % to 3 wt % of sulfur (S). For example, the passivation film may contain 0.5 wt % to 2 wt % of sulfur (S). When the content of sulfur (S) in the passivation film is within the above range, a uniform passivation film stable at high temperature may be formed, and the heating value of the passivation film at the time of penetration of the nail into the passivation film may be reduced to improve penetration characteristics.

Further, the passivation film may contain 1 wt % to 6 wt % of LiF. For example, the passivation film may contain 2 wt % to 5 wt % of LiF. For example, the passivation film may contain 3 wt % to 5 wt % of LiF. When the content of LiF in the passivation film is within the above range, a uniform passivation film stable at high temperature may be formed, and the heating value of the passivation film at the time of penetration of the nail into the passivation film may be reduced to improve penetration characteristics.

According to an embodiment, the heating value of the passivation film may be 50 J/g or less when a nail penetrates the passivation film. For example, the heating value of the passivation film may be 35 J/g or less when a nail penetrates the passivation film. For example, the heating value of the passivation film may be 5 J/g to 35 J/g when a nail penetrates the passivation film. When the heating value of the passivation film at the time of penetration of the nail into the passivation film is controlled within the above range, as described above, penetration characteristics may be improved to prevent the abnormal ignition and thermal runaway of the lithium battery.

The electrolyte of the lithium battery may include a lithium salt. The lithium salt may be dissolved in an organic solvent to act as a source of lithium ions in the battery. For example, the lithium salt may serve to promote the movement of lithium ions between the cathode and the anode.

The anion of the lithium salt included in the electrolyte may be at least one selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (here, x is a natural number), $(C_xF_{2x+1}SO_2)(C_yF_{2y+1}SO_2)N^-$ (here, x and y are natural numbers), and halide.

For example, the lithium salt may be selected from lithium difluoro (oxalate) borate (LiDFOB), lithium bis (oxalate) borate (LiBOB), lithium difluoro bis (oxalate) borate (LiDFOP), $LiBF_4$, $LiPF_6$, $LiCF_3SO_3$, $(CF_3SO_2)_2NLi$, $(FSO_2)_2NLi$, and mixtures thereof. For example, the lithium salt may be LiDFOB or LiPF.

According to an embodiment, the lithium salt may have a concentration of 0.6 M to 1.30 M. For example, the lithium salt may have a concentration of 0.8 M to 1.20 M. For example, the lithium salt may have a concentration of 0.9 M to 1.15 M. When an internal short circuit occurs due to the penetration of a nail into a battery, a large amount of current flows instantaneously, and thus heat is generated. The generation of heat may lead to an increase in internal temperature of the battery, resulting in the ignition or explosion of the battery. In this case, metal lithium explosively reacts with air or moisture to cause a greater problem in battery safety. Accordingly, the concentration of the lithium salt in the electrolyte is controlled within the above range, the heating value of the passivation film of the anode at the time of penetration of a nail into the passivation film may be reduced while maintaining the performance of the lithium battery, thereby improving the penetration characteristics of the battery.

As the lithium salt, a plurality of salts may be used. For example, $LiPF_6$ having a concentration of 0.6 M to 1.1 M may be used a main salt, and other salts such as LiDFOB, LiBOB, LiDFOP, $LiBF_4$, $LiPF_6$, $LiCF_3SO_3$, $(CF_3SO_2)_2NLi$, and $(FSO_2)_2Ni$ may be used as auxiliary salts.

Specifically, the lithium salt may include LiDFOB, LiBOB, LiDFOP, $LiBF_4$, $LiPF_6$, $LiCF_3SO_3$, $(CF_3SO_2)_2NLi$, and $(FSO_2)_2Ni$ in an amount of 0.5 wt % to 20 wt % with respect to $LiPF_6$ having a concentration of 1 M to 1.1 M, based on the total weight of the electrolyte.

However, the amount thereof is not limited to this range. The amount thereof may be used without limitation as long as the electrolyte is capable of effectively transmitting lithium ions and/or electrons during charging and discharging.

The non-aqueous solvent contained in the electrolyte serves as a medium through which ions can move during charging and discharging of the lithium secondary battery. The non-aqueous solvent may be selected from a carbonate-based solvent, an ester-based solvent, an ether-based solvent, a ketone-based solvent, an aprotic solvent, and mixtures thereof. As the carbonate-based solvent, dimethyl carbonate (DMC), diethyl carbonate (DEC), ethylmethyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), ethyl propionate (EP), propyl propionate (PP), and tetraethylene glycol dimethyl ether (TEGDME) may be used. As the ester-based solvent, methyl acetate, ethyl acetate, n-propyl acetate, dimethyl acetate, methyl propionate, ethyl propionate, γ-butyrolactone, decanolide, valerolactone, mevalonolactone, and caprolactone may be used. As the ester-based solvent, dibutyl ether, tetraglyme, diglyme, dimethoxyethane, 2-methyltetrahydrofuran, tetrahydrofuran may be used. As the ketone-based solvent, cyclohexanone may be used.

The non-aqueous solvent may be used alone or in a mixture of two or more. When the non-aqueous solvent is used in a mixture of two or more, the mixing ratio thereof may be appropriately adjusted according to battery performance, which is obvious to those skilled in the art.

In the case of the carbonate-based solvent, it is preferable to use a mixture of linear carbonate and cyclic carbonate. In this case, when the linear carbonate and the cyclic carbonate are mixed in a volume ratio of about 1:1 to about 9:1, the performance of the electrolyte may be excellent.

In some cases, in order to form a stable SEI film on the surface of the anode during charging and discharging of the lithium secondary battery, a sulfur (S)-containing compound or the like may be further included in the non-aqueous solvent. For example, the electrolyte may further include a sulfur (S)-containing compound in an amount of 0.1 wt % to 5 wt % based on the total weight of the electrolyte. For example, the electrolyte may further include a sulfur (S)-containing compound in an amount of 0.1 wt % to 3 wt % based on the total weight of the electrolyte. For example, the electrolyte may further include a sulfur (S)-containing compound in an amount of 0.5 wt % to 2 wt % based on the total weight of the electrolyte.

The sulfur-containing compound may be a sulfone compound, a sulfonate compound, a disulfonate compound, or a mixture thereof.

Specifically, the sulfone compound may be ethylmethyl sulfone, bisphenyl sulfone, divinyl sulfone, propene sultone, propane sultone, or tetramethylene sulfone, but is not limited thereto. Specifically, the sulfonate compound may be methyl methane sulfonate, ethyl methane sulfonate, or diallyl sufonate, but is not limited thereto. The sulfonate compound may be methylene methane disulfonate (MMDS), busulfan, tosyloxydisulfonate, or methylene bis methansulfonate, but is not limited thereto.

Hereinafter, other components of the lithium battery will be described in detail.

The cathode may include at least one cathode active material selected from lithium cobalt oxide, lithium nickel cobalt manganese oxide, lithium nickel cobalt aluminum oxide, lithium iron phosphate, and lithium manganese oxide, but the cathode active material is not limited thereto. The cathode may further include all cathode active materials available in the art.

For example, the cathode may further include a compound represented by any one of Formulas of $Li_aA_{1-b}B_bD_2$ (here, $0.90 \leq a \leq 1.8$, and $0 \leq b \leq 0.5$); $Li_aE_{1-b}B_bO_{2-c}D_c$ (here, $0.90 \leq a \leq 1.8$, $0 \leq b \leq 0.5$, $0 \leq c \leq 0.05$); $LiE_{2-b}B_bO_{4-c}D$ (here, $0 \leq b \leq 0.5$, $0 \leq c \leq 0.05$); $Li_aNi_{1-b-c}Co_bB_cD_\alpha$ (here, $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}$ (here, $0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}$ (here, $0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ (here, $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}$ (here, $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}$ (here, $0.90 \leq a \leq 1.8$, $0 \leq b \leq 0.5$, $0 \leq c \leq 0.05$, $0 < \alpha < 2$); $Li_aNi_bE_cG_dO_2$ (here, $0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ (here, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (here, $0.90 \leq a \leq 1.8$, $0.001 \leq b \leq 0.1$); $Li_aCoG_bO_2$ (here, $0.90 \leq a \leq 1.8$, $0.001 \leq b \leq 0.1$); $Li_aMnG_bO_2$ (here, $0.90 \leq a \leq 1.8$, $0.001 \leq b \leq 0.1$); $Li_aMn_2G_bO_4$ (here, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Formulas, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A cathode is prepared according to the following method.

The cathode is prepared by applying, drying and pressing a cathode active material on a cathode current collector. In addition to the above-described cathode active material, a cathode active material composition in which a binder and a solvent are mixed is prepared as needed.

A conductive material, a filler, etc. may be further added to the cathode active material composition.

The positive electrode active material composition is directly applied on a metal current collector and dried to prepare a cathode plate. Alternatively, the cathode active material composition may be cast on a separate support, and then a film peeled from the support may be laminated on a metal current collector to prepare a cathode plate.

For example, the loading level of the prepared cathode active material composition may be 30 $mg/cm^2$ or more, specifically, 35 $mg/cm^2$ or more, and more specifically, 40 $mg/cm^2$ or more. Further, the electrode density thereof may be 3 g/cc or more, and specifically, 3.5 g/cc or more.

In an embodiment, for high cell energy density, the loading level of the prepared cathode active material composition may be 35 $mg/cm^2$ to 50 $mg/cm^2$, and the electrode density thereof may be 3.5 g/cc to 4.2 g/cc.

In another embodiment, the cathode active material composition may be applied onto both surfaces of the cathode plate with a loading level of 37 $mg/cm^2$ and an electrode density of 3.6 g/cc.

When the loading level and electrode density of the cathode active material composition satisfy the above range, a battery including this cathode active material may exhibit a high cell energy density of 500 wh/L or more. For example, the battery may exhibit a cell energy density of 500 wh/L to 900 wh/L.

As the solvent, N-methylpyrrolidone (NMP), acetone, water, or the like may be used. The content of the solvent is 10 parts by weight to 100 parts by weight based on 100 parts by weight of the cathode active material. When the content of the solvent is within the above range, the operation for forming an active material layer is easy.

The conductive material is usually added in an amount of 1 wt % to 30 wt % based on the total weight of a mixture including the cathode active material. This conductive material is not particularly limited as long as it has conductivity without causing the chemical change of the battery. Examples of the conductive material may include graphite such as natural graphite or artificial graphite; carbon-based materials such as carbon black, acetylene black, ketjen black, channel black, furnace black, lamp black, and summer black; conductive fiber such as carbon fiber or metal fiber; metal powder such as carbon fluoride powder, aluminum powder, or nickel powder; conductive whiskey such as zinc oxide whisky or potassium titanate whisky; conductive metal oxide such as titanium oxide; and conductive materials such as polyphenylene derivatives.

The binder is a component that assists the binding of an active material and a conductive material and the binding to a current collector, and is added in an amount of about 1 wt % to 50 wt % based on the total weight of the mixture including the cathode active material. Examples of the binder may include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethersulfone, polyamide, polyacetal, polyphenylene oxide, polybutylene terephthalate, ethylene-propylene-diene polymer (EPDM), sulfonated EPDM, styrene butadiene rubber (SBR), fluorine rubber, and various copolymers. The filler is selectively used as a component that inhibits the expansion of the cathode, and is not particularly limited as long as it is a fibrous material that does not cause a chemical change of the corresponding battery. Examples of the filler include olefin-based polymers such as polyethylene and polypropylene; and fibrous materials such as glass fiber and carbon fiber.

The contents of the cathode active material, the conductive material, the filler, binder, and the solvent are levels commonly used in lithium batteries. One or more of the conductive material, the filler, the binder, and the solvent may be omitted depending on the use and configuration of the lithium battery.

For example, NMP may be used as the solvent, PVdF may be used as the binder, and carbon black or acetylene black may be used as the conductive material. For example, 94 wt % of the cathode active material, 3 wt % of the binder, and 3 wt % of the conductive material are mixed in a powder form, NMP is added to the mixture such that a solid content is 70 wt % to make a slurry, and then this slurry is applied, dried and rolled to prepare a cathode plate.

The cathode current collector is generally made to have a thickness of 3 μm to 50 μm. The cathode current collector is not particularly limited as long as it has conductivity without causing a chemical change of the corresponding battery. For example, the cathode current collector may be made of stainless steel, aluminum, nickel, calcined carbon, or may be a cathode current collector in which the surface of aluminum or stainless steel is surface-treated with carbon, nickel, titanium, or silver. The cathode current collector may be provided with fine irregularities on the surface thereof to increase the adhesion of the cathode active material, and the cathode current collector may be formed in various forms such as a film, a sheet, a foil, a net, a porous body, a foam, and a non-woven fabric.

The anode may include an anode active material including a metal alloyable with lithium and/or a carbon-based anode active material.

For example, the anode active material including a metal alloyable with lithium may include at least one of silicon (Si), a silicon (Si)-carbon (C) composite material including silicon (Si) particles, and $SiO_{a'}$ ($0<a'<2$).

In an embodiment, the average diameter of the silicon (Si) particles in the silicon (Si)-carbon (C) composite material may be 200 nm or less. For example, the average diameter of the silicon (Si) particles in the silicon (Si)-carbon (C) composite material may be 10 nm to 150 nm. For example, the average diameter of the silicon (Si) particles in the silicon (Si)-carbon (C) composite material may be 10 nm to 100 nm.

In an embodiment, the average diameter of the silicon (Si)-carbon (C) composite material may be 20 μm or less. For example, the average diameter of the silicon (Si)-carbon (C) composite material may be 5 μm to 20 μm. For example, the average diameter of the silicon (Si)-carbon (C) composite material may be 10 μm to 15 μm.

For example, the capacity of the silicon (Si)-carbon (C) composite material may be 600 mAh/g to 2000 mAh/g. For example, the capacity of the silicon (Si)-carbon (C) composite material may be 800 mAh/g to 1600 mAh/g.

The silicon (Si)-carbon (C) composite material may be used as mixture with a graphite material. For example, 12% of the silicon (Si)-carbon (C) composite material having a capacity of 1300 mAh/g, 85% of graphite, and 3% of the binder may constitute an anode having a capacity of 500 mAh/g. In this case, when the silicon (Si)-carbon (C) composite material having a capacity of 1300 mAh/g is used, battery performance may be good compared to when SiO having a capacity of 500 mAh/g or the silicon (Si)-carbon (C) composite material having a capacity of 500 mAh/g is used.

For example, the carbon-based anode active material may include graphite.

The anode may include Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn) in addition to the aforementioned anode active material. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

An anode is prepared according to the following method.

The anode is prepared by applying, drying and pressing an anode active material on an anode current collector. In addition to the above-described anode active material, an anode active material composition in which a binder and a solvent are mixed is prepared as needed.

A conductive material, a filler, etc. may be further added to the anode active material composition.

Meanwhile, the conductive material, binder and solvent in the anode active material composition may be the same as those in the cathode active material composition.

However, in the anode active material composition, water may be used as the solvent. For example, water may be used as the solvent, CMC or SBR, an acrylate-based polymer, or a methacrylate-based polymer may be used as the binder, and carbon black, acetylene black, or graphite can be used as the conductive material. For example, 94 wt % of the anode active material including the silicon (Si)-carbon (C) composite material and graphite, 3 wt % of the binder, and 3 wt % of the conductive material are mixed in a powder form, water is added to the mixture such that a solid content is 70 wt % to make a slurry, and then this slurry is applied, dried and rolled to prepare an anode plate.

The loading level of the prepared anode active material composition is set according to the loading level of the cathode active material composition.

For example, the loading level of the anode active material composition may be 12 mg/cm$^2$ or more, specifically, 15 mg/cm$^2$ or more, according to the capacity thereof per g. Further, the electrode density thereof may be 1.5 g/cc or more, specifically, 1.6 g/cc or more.

The capacity per g may be changed by adjusting the ratio of the silicon (Si)-carbon (C) composite material and graphite. For example, in the case of graphite, the maximum capacity of the anode active material composition may be 360 mAh/g. In the case of 84% of graphite, 14% of the silicon (Si)-carbon (C) composite material having a capacity of 1300 mAh/g, and 2% of the binder, anode capacity of about 500 mAh/g may be exhibited. When the silicon (Si)-carbon (C) composite material is mixed with SiO, the anode capacity may be 380 mAh/g to 800 mAh/g. When the anode capacity is 380 mAh/g or less, there is no mixing effect, and when the anode capacity is more than 800 mAh/g, a retention rate severely decreases.

The anode current collector is generally made to have a thickness of 3 μm to 50 μm. The anode current collector is not particularly limited as long as it has conductivity without causing a chemical change of the corresponding battery. For example, the anode current collector may be made of copper, stainless steel, aluminum, nickel, calcined carbon, may be an anode current collector in which the surface of copper or stainless steel is surface-treated with carbon, nickel, titanium, or silver, or may be made of an aluminum-cadmium alloy. Similarly to the cathode current collector, the anode current collector may be provided with fine irregularities on the surface thereof to increase the adhesion of the anode active material, and the anode current collector may be formed in various forms such as a film, a sheet, a foil, a net, a porous body, a foam, and a non-woven fabric.

The lithium battery may further include a separator between the cathode and the anode. As the separator, a thin insulating film having high ion permeability and mechanical strength is used. The pore diameter of the separator is generally 0.001 μm to 1 μm, and the thickness thereof is 3 μm to 30 μm. As the separator, for example, a sheet or non-woven fabric made of an olefin polymer such as polypropylene having chemical resistance and hydrophobicity, a glass fiber, or polyethylene may be used. When a solid electrolyte such as a polymer is used as the electrolyte, the solid electrolyte may also serve as a separator.

The electrolyte may further include an organic solid electrolyte and an inorganic solid electrolyte in addition to the aforementioned electrolyte.

Examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers having an ionic dissociation group.

Examples of the inorganic solid electrolyte may include lithium (Li) nitrides such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$; halides; and sulfates.

The lithium battery may be prepared by injecting an electrolyte into the cathode and the anode. The aforementioned cathode, anode and separator are wound or folded to be accommodated in a battery container, and then an electrode is injected into the battery container, and the battery container is sealed by a sealing member to complete a battery assembly. As the battery container, for example, a case made of a light metal material such as aluminum or steel may be appropriately employed. In the present disclosure, the term "battery assembly" is referred to as a battery assembly obtained by assembling the electrode bodies and the non-aqueous electrolyte prior to the charging step.

Then, the battery assembly may be charged and then heat-treated under environments of high temperature and high pressure.

In this case, as the state of charge (SOC) of the battery increases, that is, as the charged energy increases, when the battery is penetrated by a sharp object such as a nail, the temperature in the battery increases to induce ignition or thermal runaway. This phenomenon is accelerated and the heating value increases, so there is a greater risk of stability. For example, as graphite used as the anode includes a larger amount of lithium (as the state of charge (SOC) increases), the heating value due to the decomposition of the electrolyte may increase.

According to an embodiment, during the initial charging, the battery assembly may be charged to 50% or more and 100% or less by the state of charge (SOC). For example, the state of charge (SOC) may be 80% to 100%. For example, the state of charge (SOC) may be 100%. The battery assembly may be charged up to the state of charge (SOC), thereby appropriately reducing and decomposing a part of the non-aqueous electrolyte in the anode. Thus, an anode passivation film composed of the decomposition product of the non-aqueous electrolyte may be suitably formed on the surface of the anode. Further, when the battery assembly is overcharged such that the SOC is more than 100%, the cathode active material no longer releases lithium, so that a cathode voltage increases, and thus heat may be generated together with the elution of an active material, the decomposition of an electrolyte, and the collapse of a structure.

According to an embodiment, the lithium battery may have an initial capacity ratio of the cathode and the anode, that is, a capacity ratio ($C_N/C_P$) of a charging capacity ($C_N$) of the anode to a charging capacity ($C_P$) of the cathode of 1.06 or less. For example, the lithium battery may have a capacity ratio ($C_N/C_P$) of a charging capacity ($C_N$) of the anode to a charging capacity ($C_P$) of the cathode of 1.0 to 1.06. When the capacity ratio ($C_N/C_P$) is more than 1.06, lithium is forcibly supplied to the anode in an amount exceeding the amount of lithium capable of being stored in the anode active material, so that lithium ions may be electrodeposited on the surface of the anode active material and grown without being stored in the anode active material. Metal lithium is grown in a needle shape to promote side reactions with the electrolyte as well as to cause an internal short circuit in which the metal lithium penetrates the separator and contacts the anode, thereby causing ignition or thermal runaway.

According to an embodiment, in the lithium battery, the concentration of a lithium salt in the electrolyte may be 0.6 M or more and less than 1.30 M, the capacity ratio ($C_N/C_P$) of a charging capacity ($C_N$) of the anode to a charging capacity ($C_P$) of the cathode may be 1.0 to 1.06, and the state of charge (SOC) may be 100%.

As described above, when the concentration of a lithium salt in the electrolyte is controlled to be 0.6 M or more and less than 1.30 M, the state of charge (SOC) is 100%, and the capacity ratio ($C_N/C_P$) of a charging capacity ($C_N$) of the anode to a charging capacity ($C_P$) of the cathode is controlled to be 1.0 to 1.06, the heating value of the passivation film of the anode at the time of penetration of a nail into the passivation film may be controlled to be 50 J/g or less without deteriorating the performance of the battery, and thus the ignition or thermal runaway of the battery may be prevented.

The charged battery assembly may be heat-treated under environments of high temperature and high pressure, thereby reforming the passivation film formed on the anode into a uniform film stable to high temperature.

According to an embodiment, the lithium battery may be heat-treated at a temperature of 50° C. to 150° C. under a pressure of 1 kgf/cm$^2$ to 20 kgf/cm$^2$. For example, the lithium battery may be heat-treated at a temperature of 60° C. to 120° C. under a pressure of 5 kgf/cm$^2$ to 15 kgf/cm$^2$. For example, the lithium battery may be heat-treated at a temperature of 70° C. to 100° C. under a pressure of 8 kgf/cm$^2$ to 12 kgf/cm$^2$. When the lithium battery is heat-treated at a temperature of 50° C. to 150° C. under a pressure of 1 kgf/cm² to 20 kgf/cm², a uniform passivation film stable to high temperature may be formed on the surface of the anode, and the heating value of the passivation film may be controlled to be 50 J/g or less without deteriorating the performance of the battery when the battery is exposed to high temperature due to the penetration of a nail into the passivation film, thereby preventing the ignition or thermal runaway of the battery.

A method of manufacturing the lithium battery of may include: (a) preparing a battery assembly having a concentration of a lithium salt in the electrolyte of 0.6 M or more and less than 1.30 M and a capacity ratio ($C_N/C_P$) of a charging capacity ($C_N$) of the anode to a charging capacity ($C_P$) of the cathode of 1.0 to 1.06; and (b) charging the battery assembly to a state of charge (SOC) of 50% to 100% and heat-treating the battery assembly at a temperature of 50° C. to 150° C. under a pressure of 1 kgf/cm² to 20 kgf/cm².

In this case, the heat treatment may be performed for 1 hour to 6 hours. For example, the heat treatment may be performed for 2 hours to 5 hours. For example, the heat treatment may be performed for 2 hours to 4 hours. When the heat treatment may be performed for 1 hour to 6 hours, a uniform passivation film stable to high temperature may be formed on the surface of the anode, and the heating value of the passivation film of the anode may be controlled to 50 J/g or less without deteriorating the performance of the battery when the battery is exposed to high temperature due to the penetration of a nail into the battery, and thus the ignition or thermal runaway of the battery may be prevented.

Then, the heat-treated battery assembly may be cooled at room temperature for 6 hours to 10 hours. For example, the heat-treated battery assembly may be cooled at room temperature for 7 hours to 9 hours.

Since the method of manufacturing the lithium battery is widely known in the art, a detailed description thereof will be omitted.

As shown in FIG. 1, the lithium secondary battery 1 includes a cathode 3, an anode 2, and a separator 4. The anode 3, the cathode 2, and the separator 4 are wound or folded and accommodated in a battery case 5. Then, an organic electrolyte is injected into the battery case 5, and the battery case 5 is sealed with a cap assembly 6 to complete the lithium secondary battery 1. The battery case 5 may have a cylindrical shape, a rectangular shape, or a thin film shape. For example, the lithium battery 1 may be a thin film battery. The lithium battery 1 may be a lithium ion battery. The lithium battery 1 may be a lithium polymer battery.

The separator 4 may be located between the anode 3 and the cathode 2 to form a battery structure. The battery structure is laminated as a bi-cell structure or rolled in a jelly roll form, and then impregnated with an organic electrolyte, and the resulting product is accommodated in a pouch and sealed to complete a lithium ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

Further, since the lithium battery is excellent in I high rate characteristics and lifetime characteristics, it may be used in electric vehicles (EV). For example, the lithium battery may be used in hybrid vehicles such as plug-in hybrid electric vehicles.

MODE OF DISCLOSURE

The present inventive concept will be described in more detail through the following Examples and Comparative Examples. However, these Examples are for illustrating the present inventive concept, and the scope of the present inventive concept is not limited thereto.

(Manufacture of Lithium Battery)

Example 1

(Preparation of Anode)

97 wt % of graphite particles (G1, Zichen) having an average particle diameter of 25 μm, 1.5 wt % of a styrene-butadiene rubber (SBR) binder (Zeon), and 1.5 wt % of carboxymethyl cellulose (CMC, manufactured by JEIL-PHARM CO., LTD.) were mixed, introduced into distilled water, and then stirred for 60 minutes using a mechanical stirrer to prepare an anode active material slurry. The slurry was applied onto a copper current collector having a thickness of 10 μm using a doctor blade, dried at 100° C. for 0.5 hours using a hot air dryer, further dried in vacuum at 120° C. for 4 hours, and then roll-pressed to prepare an anode plate.

(Preparation of Cathode)

97 wt % of $LiCoO_2$, 1.5 wt % of carbon black powder as a conductive material, and 1.5 wt % of polyvinylidene fluoride (PVdF, SOLVAY) were mixed, introduced into an N-methyl-2-pyrrolidone solvent, and then stirred for 30 minutes using a mechanical stirrer to prepare a cathode active material slurry. The slurry was applied onto an aluminum current collector having a thickness of 12 μm using a doctor blade, dried at 100° C. for 0.5 hours using a hot air dryer, further dried in vacuum at 120° C. for 4 hours, and then roll-pressed to prepare a cathode plate.

(Preparation of Battery Assembly)

A polyethylene separator having a thickness of 14 μm was interposed between the prepared cathode plate and the prepared anode plate, and then rolled to prepare a battery assembly jelly roll. The jelly roll was inserted into a pouch, an electrolyte was injected into the pouch, and then the pouch was sealed in vacuum to construct a battery assembly jelly roll having a capacity ratio ($C_N/C_P$) of 1.06.

As the electrolyte, an electrolyte in which $LiPF_6$ is dissolved in a mixed solvent of ethylene carbonate (EC)/propylene carbonate (PC)/ethyl propionate (EP)/propyl propionate (PP) of 2/1/3/4 (volume ratio) was used. 2 parts by weight (2 wt %) of 1,3-propane sultone was added to the electrolyte and dissolved.

The battery assembly jelly roll inserted into the pouch was charged with a constant current at a current of 0.2 C rate at 45° C. until a voltage reached 4.3 V while applying a pressure of 6.3 kgf/cm² to the battery assembly jelly roll, and was then charged with a constant voltage until the current reached 0.05 C while maintaining the voltage at 4.3 V, thereby charging the battery assembly jelly roll to 100% of SOC.

Subsequently, the charged battery assembly was put into a thermostat, heat-treated at 80° C. for 3 hours while applying a pressure of 10 kgf/cm² (hereinafter, referred to as "high temperature and high pressure heat treatment"), and then cooled at room temperature for 8 hours.

Example 2

A lithium battery was manufactured in the same manner as in Example, except that SOC 50% was instead of SOC 100%, and the high temperature and high pressure heat treatment was not performed.

Comparative Example 1

A lithium battery was manufactured in the same manner as in Example, except that high temperature and the high pressure heat treatment was not performed.

Comparative Example 2

A lithium battery was manufactured in the same manner as in Example, except that 1.30 M $LiPF_6$ was used instead of 1.15M $LiPF_6$, and the high temperature and high pressure heat treatment was not performed.

Comparative Example 3

A lithium battery was manufactured in the same manner as in Example, except that the capacity ratio ($C_N/C_P$) was 1.08 instead of 1.06, and the high temperature and high pressure heat treatment was not performed.

Comparative Example 4

A lithium battery was manufactured in the same manner as in Example, except that the high temperature and high pressure heat treatment was not performed, and 10 parts by weight (10 wt %) of 1,3-propane sultone was added instead of 2 parts by weight (2 wt %) of 1,3-propane sultone.

Evaluation Example 1: Evaluation of Content of Sulfur (S) in Anode Passivation Film The lithium batteries manufactured in Example 1 and Comparative Examples 1 to 4 were disassembled, and then the anode plates were separated, and X-ray Photoelectron Spectroscopy (XPS) for the anode passivation films was measured.

Figure 2:
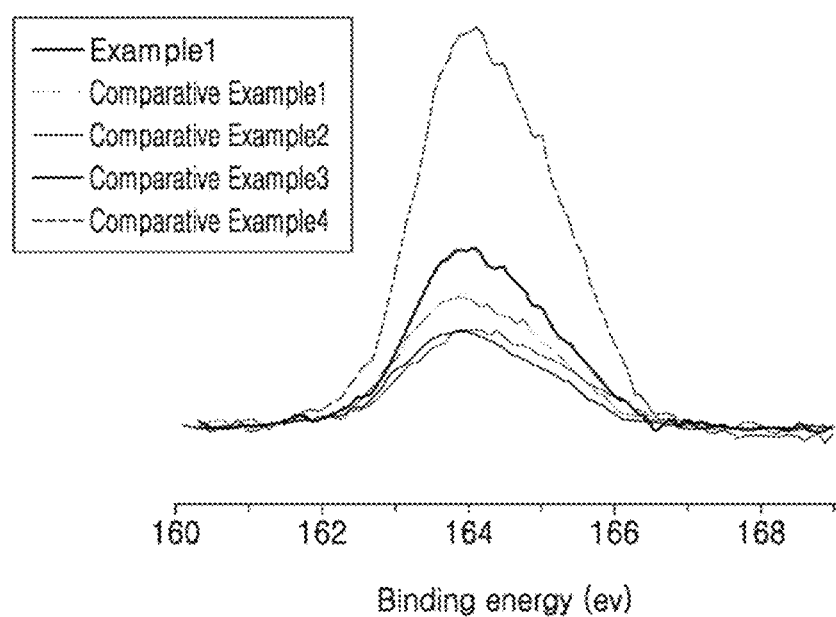
FIG. 2 illustrates the results of X-ray photoelectron spectroscopy (XPS) of the contents of sulfur (S) in the anode passivation films according to Example 1 and Comparative Examples 1 to 4.

The XPS results of the anode passivation films of the lithium batteries of Example 1 and Comparative Examples 1 to 4 at S 2p peak (about 164 eV) are shown in FIG. 2, and the contents of sulfur (S) in the anode passivation films are given in Table 1 below.

TABLE 1

|  | Content of sulfur (S) (wt %) |
| --- | --- |
| Example 1 | 0.5 |
| Comparative Example 1 | 0.4 |
| Comparative Example 2 | 0.3 |
| Comparative Example 3 | 0.3 |
| Comparative Example 4 | 5 |

As given in Table 1 above, in the case of Example 1, it may found that the content of sulfur (S) in the anode passivation film is 0.5 wt %. In contrast, in the case of Comparative Examples 1 to 3, it may be found that the content of sulfur (S) in each of the anode passivation films is 0.4 wt % or less, and in the case of Comparative Example 4, it may be found that the content of sulfur (S) in the anode passivation film is 5 wt %.

Evaluation Example 2: Evaluation of Content of LiF in Anode Passivation Film The lithium batteries manufactured in Example 1 and Comparative Examples 1 to 4 were disassembled, and then the anode plates were separated, and X-ray Photoelectron Spectroscopy (XPS) for the anode passivation films was measured.

Figure 3:
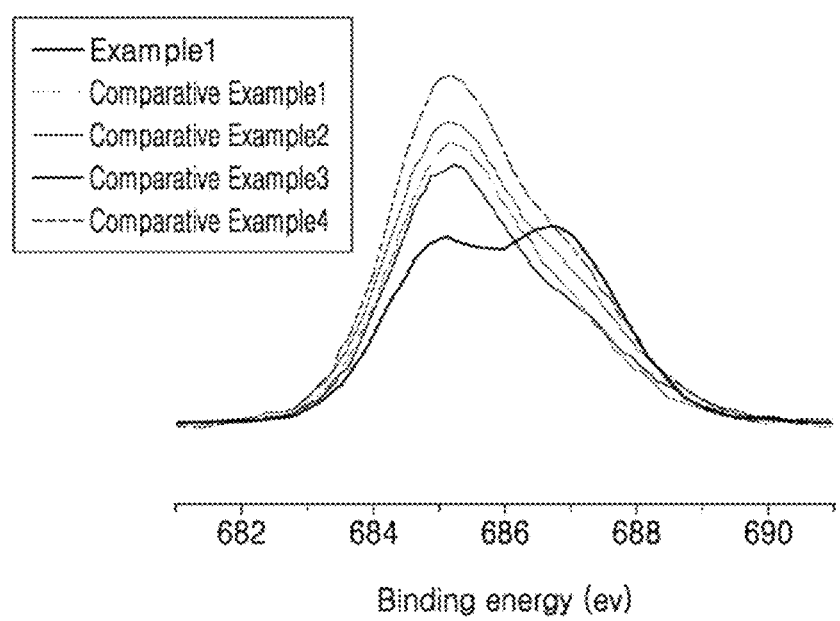
FIG. 3 illustrates the results of XPS of the contents of LiF in the anode passivation films according to Example 1 and Comparative Examples 1 to 4.

The XPS results of the anode passivation films of the lithium batteries of Example 1 and Comparative Examples 1 to 4 at F 1s peak (about 685 eV) are shown in FIG. 3, and the contents of LiF in the anode passivation films are given in Table 2 below.

TABLE 2

|  | Content of LiF (wt %) |
| --- | --- |
| Example 1 | 4 |
| Comparative Example 1 | 7 |
| Comparative Example 2 | 7.9 |
| Comparative Example 3 | 6.2 |
| Comparative Example 4 | 9.8 |

As given in Table 2 above, in the case of Example 1, it may found that the content of LiF in the anode passivation film is 4 wt %. In contrast, in the case of Comparative Examples 1 to 3, it may be found that the content of LiF in each of the anode passivation films is more than 6 wt %, and in the case of Comparative Example 4, it may be found that the content of LiF in the anode passivation film is 9.8 wt %.

Evaluation Example 3: Measurement of Surface Morphology of Anode Passivation Film The lithium batteries manufactured in Example 1 and Comparative Examples 1 to 4 were disassembled, and then the anode plates were separated. The surface images of the anode passivation films were measured using a scanning electron microscope (SEM), and results thereof are shown in FIG. 4.

Figure 4:
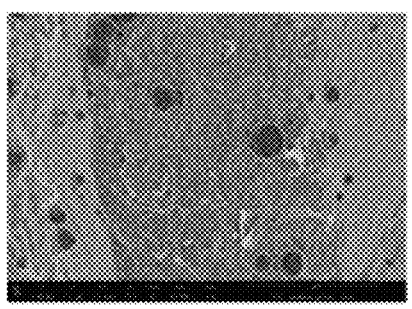
FIG. 4 illustrates scanning electron microscope (SEM) results of morphologies of the anode passivation films according to (a) Example 1, (b) Comparative Example 1, (c) Comparative Example 2, (d) Comparative Example 3, and (e) Comparative Example 4.
Figure 4:
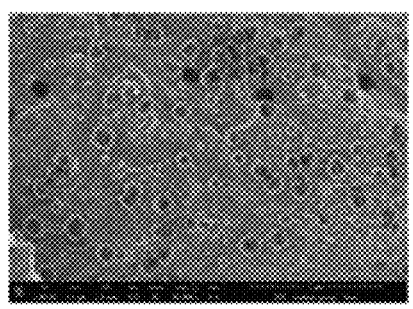
Figure 4:
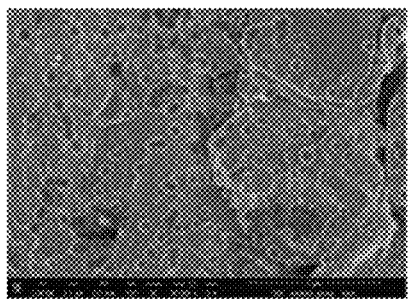
Figure 4:
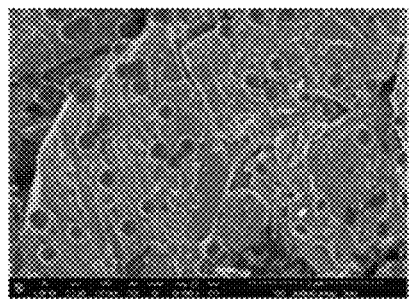
Figure 4:
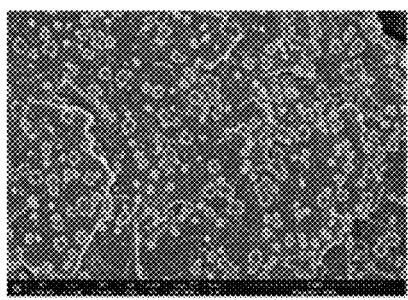

As shown in FIG. 4, in the case of the anode passivation film of Example 1, it may be found that the passivation film is compact, and is evenly distributed. In contrast, in the case of the anode passivation films of Comparative Examples 1 to 4, it may be found that a large amount of LiF components is included in each of the anode passivation films, and thus particulate passivation film is large and is not compact.

Evaluation Example 4: Evaluation of Penetration Characteristics According to Heating Value of Anode Passivation Film Each of the lithium batteries manufactured in Example 1 and Comparative Examples 1 to 4 was penetrated by a nail, and then the leakage and ignition thereof were evaluated. The lithium batteries were disassembled, and then the anode plates were separated. Then, the heating values in a temperature range of 50° C. to 400° C. were measured at a temperature increase rate of 10° C./min using a differential scanning calorimeter (DSC), the decomposition heating values of the anode passivation films were measured in a temperature range of 100° C. to 180° C., and results thereof are given in Table 3 below.

In this case, a nail having a diameter of 3 mm penetrated through the battery at a rate of 100 mm/sec.

TABLE 3

|  | Anode passivation film decomposition heating value | Penetration test |
| --- | --- | --- |
| Example 1 | 31 | Leaked, unignited |
| Example 2 | 0 | Leaked, unignited |
| Comparative Example 1 | 82 | Leaked, smoked, ignited |
| Comparative Example 2 | 107 | Leaked, smoked, ignited |

TABLE 3-continued

| | Anode passivation film decomposition heating value | Penetration test |
|---|---|---|
| Comparative Example 3 | 119 | Leaked, smoked, ignited |
| Comparative Example 4 | 135 | Leaked, smoked, ignited |

As given in Table 3 above, in the lithium battery of Example 1, the heating value of the anode passivation film was 31 J/g. In contrast, in the lithium batteries of Comparative Examples 1 to 4, all of the heating values of the anode passivation films were more than 50 J/g. Further, in the lithium battery of Example 1, during the penetration test, only leakage occurred, and ignition did not occur. In contrast, in the lithium batteries of Comparative Examples 1 to 4, smoking and ignition as well as leakage occurred.

INDUSTRIAL APPLICABILITY

In the lithium battery, since the heating value of the anode passivation film at time of penetration of a nail into the anode passivation film is controlled to be 50 J/g or less, the penetration characteristics of the lithium battery may be improved without deteriorating the performance of the battery to suppress the ignition and thermal runaway of the battery, thereby improving the stability of the battery.

The invention claimed is:

1. A lithium battery comprising:
a cathode; an anode including a passivation film; and an electrolyte interposed between the cathode and the anode,
wherein:
the electrolyte includes methyl methane sulfonate, ethyl methane sulfonate, or diallyl sulfonate,
the passivation film includes 0.5 wt % or more and less than 5 wt % of sulfur (S),
the passivation film has a peak at about 164 eV and does not have a peak at about 169 eV in X-ray Photoelectron Spectroscopy,
the lithium battery is charged and then heat-treated under a pressure of 5 kgf/cm² to 20 kgf/cm², and
the passivation film has a heating value of 50 J/g or less when a nail penetrates the passivation film.

2. The lithium battery of claim 1, wherein the passivation film includes 0.5 wt % to 2 wt % of sulfur (S).

3. The lithium battery of claim 1, wherein the passivation film includes 1 wt % to 6 wt % of LiF.

4. The lithium battery of claim 1, wherein the passivation film has a heating value of 35 J/g or less when a nail penetrates the passivation film.

5. The lithium battery of claim 1, wherein the electrolyte includes a lithium salt and a non-aqueous solvent.

6. The lithium battery of claim 5, wherein the lithium salt is selected from lithium difluoro (oxalate) borate (LiDFOB), lithium bis (oxalate) borate (LiBOB), lithium difluoro bis (oxalate) borate (LiDFOP), $LiBF_4$, $LiPF_6$, $LiCF_3SO_3$, $(CF_3SO_2)_2NLi$, $(FSO_2)_2NLi$, and mixtures thereof.

7. The lithium battery of claim 6, wherein the lithium salt has a concentration of 0.6 M to 1.30 M.

8. The lithium battery of claim 5, wherein the non-aqueous solvent is selected from dimethyl carbonate (DMC), diethyl carbonate (DEC), ethylmethyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), ethyl propionate (EP), propyl propionate (PF), tetraethylene glycol dimethyl ether (TEGDME), and mixtures thereof.

9. The lithium battery of claim 1, wherein the cathode includes at least one cathode active material selected from lithium cobalt oxide, lithium nickel cobalt manganese oxide, lithium nickel cobalt aluminum oxide, lithium iron phosphate, and lithium manganese oxide.

10. The lithium battery of claim 1, wherein the anode includes an anode active material containing a metal alloyable with lithium, a carbon-based anode active material, or a mixture thereof.

11. The lithium battery of claim 10, wherein the anode active material containing a metal alloyable with lithium includes at least one of silicon (Si), a silicon (Si)-carbon (C) composite material, and $SiO_{a'}$ (0<a'<2).

12. The lithium battery of claim 1, wherein the lithium battery has a state of charge (SOC) of 50% to 100%.

13. The lithium battery of claim 1, wherein the lithium battery has a state of charge (SOC) of 100%.

14. The lithium battery of claim 1, wherein the lithium battery has a capacity ratio ($C_N/C_P$) of a charging capacity ($C_N$) of the anode to a charging capacity ($C_P$) of the cathode of 1.0 to 1.06.

15. The lithium battery of claim 1, wherein the lithium battery has a concentration of a lithium salt in the electrolyte of 0.6 M or more and less than 1.30 M, a capacity ratio ($C_N/C_P$) of a charging capacity ($C_N$) of the anode to a charging capacity ($C_P$) of the cathode of 1.0 to 1.06, and a state of charge (SOC) of 100%.

16. The lithium battery of claim 1, wherein the lithium battery is heat-treated at a temperature of 50° C. to 150° C.

17. The lithium battery of claim 1, wherein the lithium battery is heat-treated at a temperature of 70° C. to 150° C. under a pressure of 5 kgf/cm² to 20 kgf/cm² for 1 hour to 6 hours.

18. A method of manufacturing the lithium battery of claim 1, the method comprising:
(a) preparing a battery assembly having a concentration of a lithium salt in the electrolyte of 0.6 M or more and less than 1.30 M and a capacity ratio ($C_N/C_P$) of a charging capacity ($C_N$) of the anode to a charging capacity ($C_P$) of the cathode of 1.0 to 1.06; and
(b) charging the battery assembly to a state of charge (SOC) of 50% to 100% and then heat-treating the battery assembly at a temperature of 50° C. to 150° C. under the pressure of 5 kgf/cm² to 20 kgf/cm².

19. The method of claim 18, wherein the heat treatment is performed for 1 hour to 6 hours.

* * * * *